United States Patent
Tsai et al.

(10) Patent No.: US 7,499,116 B2
(45) Date of Patent: Mar. 3, 2009

(54) SYSTEMS FOR DISPLAYING IMAGES HAVING MICRO-REFLECTIVE TRANSMISSION LIQUID CRYSTAL DISPLAY WITH PARTICULAR STORAGE CAPACITOR ARRANGEMENT

(75) Inventors: Chia-Yi Tsai, Luodong Township (TW); Mu-Chia Lee, Taipei (TW); Shih-Chang Chang, Jhudong Township (TW)

(73) Assignee: TPO Displays Corp., Chu-Nan (TW)

( * ) Notice: Subject to any disclaimer, the term of this patent is extended or adjusted under 35 U.S.C. 154(b) by 395 days.

(21) Appl. No.: 11/402,586

(22) Filed: Apr. 11, 2006

(65) Prior Publication Data

US 2007/0236621 A1 Oct. 11, 2007

(51) Int. Cl.
*G02F 1/1343* (2006.01)
*G02F 1/1335* (2006.01)

(52) U.S. Cl. .......................... 349/38; 349/114; 349/106
(58) Field of Classification Search .................. 349/38, 349/114, 106
See application file for complete search history.

(56) References Cited

U.S. PATENT DOCUMENTS

| | | | |
|---|---|---|---|
| 6,816,355 B2 * | 11/2004 | Watanabe | 361/306.3 |
| 7,012,365 B2 * | 3/2006 | Adachi et al. | 313/504 |
| 7,365,722 B2 * | 4/2008 | Lee | 345/88 |
| 2006/0139522 A1 * | 6/2006 | Chang et al. | 349/114 |
| 2007/0063192 A1 * | 3/2007 | Peng | 257/40 |

* cited by examiner

*Primary Examiner*—Mike Qi
(74) *Attorney, Agent, or Firm*—Liu & Liu (57) ABSTRACT

Systems for displaying images including a micro-reflective transmission liquid crystal display with improved reflection and reflective contrast ratio (CR). The micro-reflective transmission liquid crystal display comprises a first substrate, a second substrate, and a liquid crystal layer interposed between the first substrate and the second substrate. The first substrate comprises an array of three primary color sub-pixel regions and a white sub-pixel region. Each pixel region has a transistor and a storage capacitor with respect to the transistor. The storage capacitor with respect to the storage capacitor of the white sub-pixel region is disposed within the area of one of the three primary color sub-pixel regions.

20 Claims, 10 Drawing Sheets

SYSTEMS FOR DISPLAYING IMAGES HAVING MICRO-REFLECTIVE TRANSMISSION LIQUID CRYSTAL DISPLAY WITH PARTICULAR STORAGE CAPACITOR ARRANGEMENT

BACKGROUND

The invention relates to systems for displaying images, and more particularly, to micro-reflective transmission liquid crystal displays.

Liquid crystal displays (LCDs) are widely used in information displays. Generally, liquid crystal displays (LCDs) comprise a liquid crystal panel assembly including two substrates provided with two kinds of field generating electrodes such as pixel electrodes and a common electrode and a liquid crystal layer with dielectric anisotropy interposed therebetween. The variation of the voltage difference between the field generating electrodes, i.e., the variation in the strength of an electric field generated by the electrodes, changes the transmittance of the light passing through the LCD, and desired images are thus obtained by controlling the voltage difference between the electrodes.

The conventional three primary color LCD comprises a plurality of pixels with pixel electrodes and red (R), green (G) and blue (B) color filters. Each pixel is separately driven to perform display operation by way of the signals applied thereto through display signal lines. The signal lines include gate lines (or scanning signal lines) for carrying the scanning signals, and data lines for carrying data signals. Each pixel has a thin film transistor (TFT) connected to one of the gate lines and one of the data lines to control the data signals applied to the pixel electrode. However, the conventional three primary color LCDs have poor optical efficiency which may be eliminated by adding a white pixel spacer to set the three RGB color pixels apart in a transmissive LCD device.

Figure 1A:
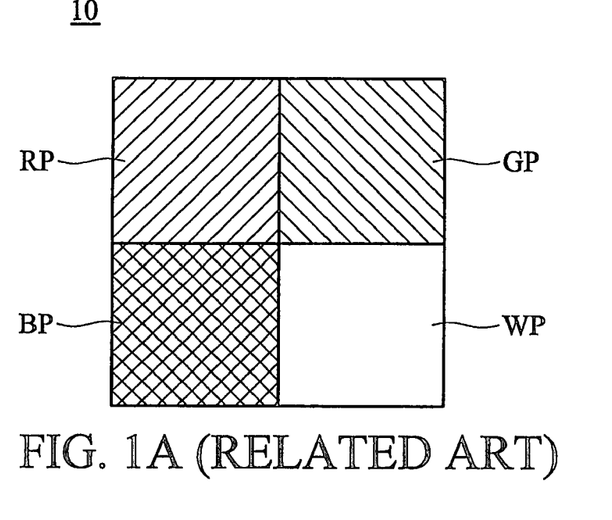
FIG. 1A shows the spatial arrangement of four color RGBW pixels of a conventional LCD.
Figure 1B:
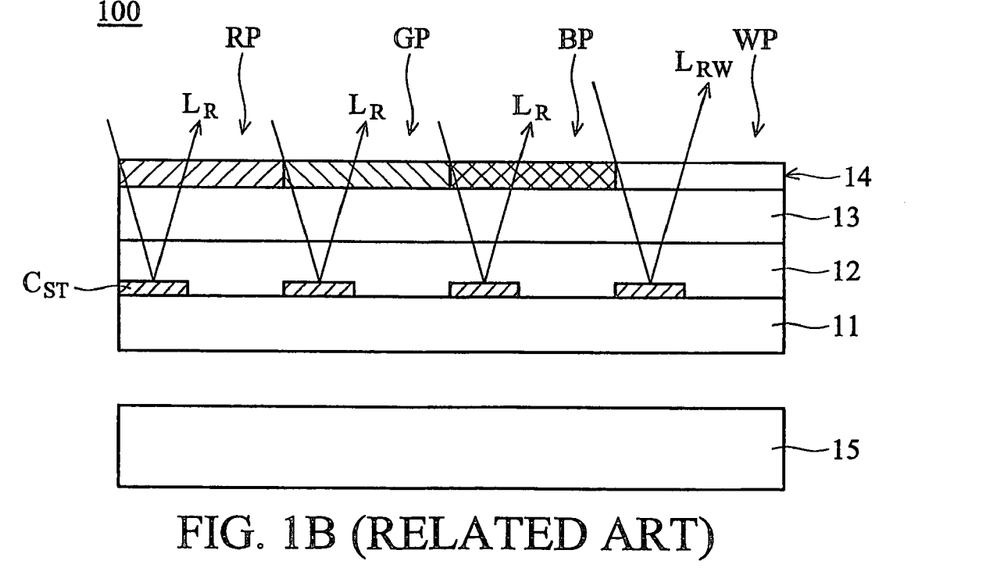
FIG. 1B is a cross-section of an arrangement of a conventional micro-reflective transmission display.

FIG. 1A shows the spatial arrangement of four color RGBW pixels of a conventional LCD. The conventional four color LCD 10 includes a plurality of pixel regions of red (RP), green (GP), blue (BP), and white (WP). The white pixel (WP) may have no color filter. FIG. 1B is a cross-section of an arrangement of a conventional micro-reflective transmission display. A micro-reflective transmission liquid crystal display 100 comprises a liquid crystal panel assembly including a lower substrate 11 provided with storage capacitor $C_{ST}$ and thin film transistor (not shown) thereon, an upper substrate 13, and a liquid crystal layer 12 with dielectric anisotropy interposed between the lower substrate 11 and the upper substrate 13. A color filter 14 is disposed on the upper substrate 13. The micro-reflective transmission display 100 can provide a reflective image due to reflection of the ambient light from the backlight unit (BLU) 15.

Figure 2:
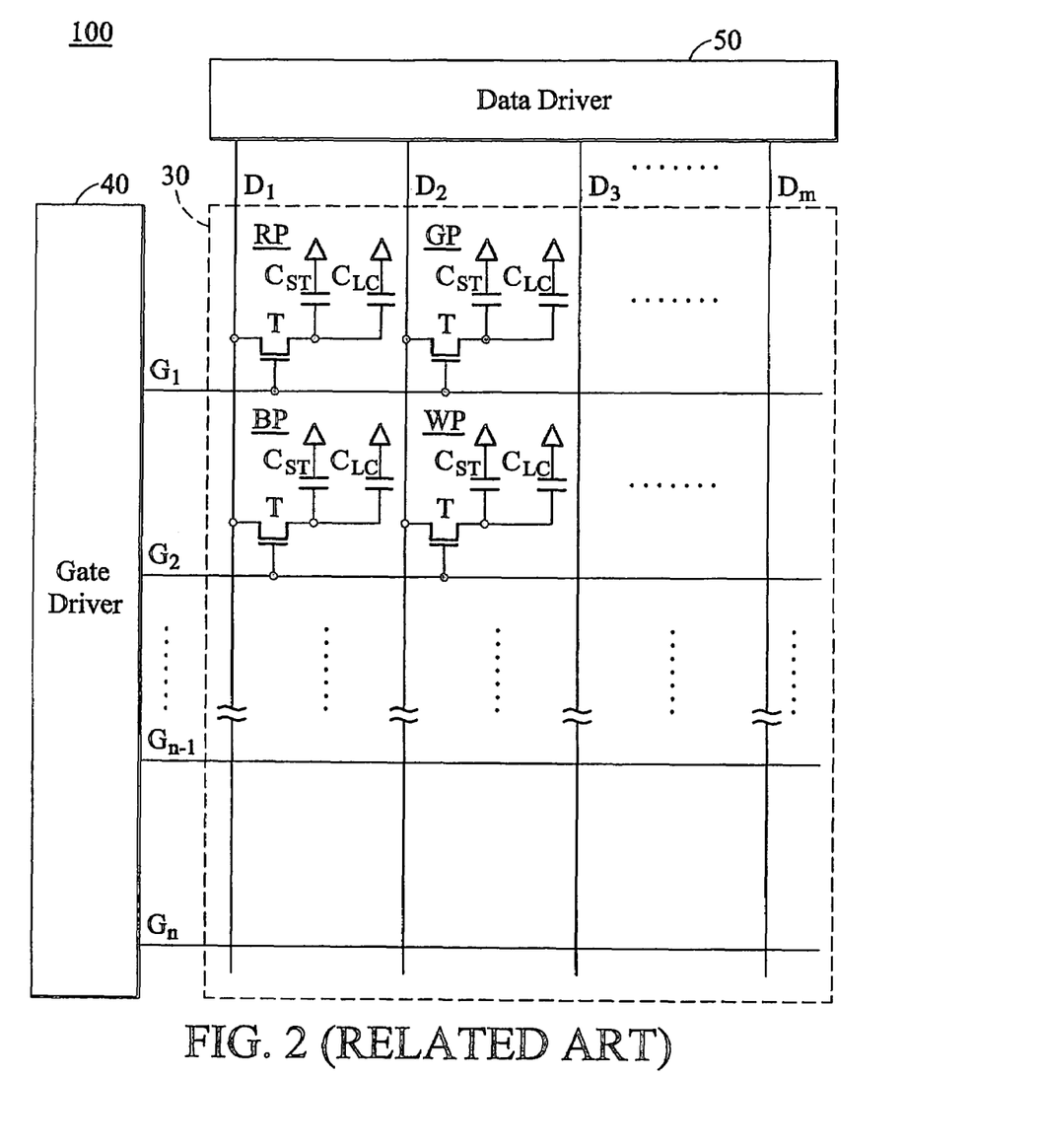
FIG. 2 is a block diagram of a conventional micro-reflective transmission LCD.

FIG. 2 is a block diagram of a conventional micro-reflective transmission LCD. The micro-reflective transmission display LCD 100 comprises an LC panel assembly 30, a gate driver 40 and a data driver 50 which are connected to the panel assembly 30, and a signal controller (not shown) controlling the desired elements.

The LC panel assembly 30, in the structural view shown in FIG. 1B, includes a lower substrate 11, an upper substrate 13 and a liquid crystal layer 12 interposed therebetween. The LC panel includes a plurality of display signal lines $G_1$-$G_n$ and $D_1$-$D_m$ and a plurality of pixels connected thereto and arranged substantially in a matrix as shown in circuital view of FIG. 1A.

The display signal lines $G_1$-$G_n$ and $D_1$-$D_m$ are provided on the lower substrate 11 and comprise a plurality of gate lines $G_1$-$G_n$ transmitting gate signals (called scanning signals) and a plurality of data lines $D_1$-$D_m$ transmitting data signals. The gate lines $G_1$-$G_n$ extend substantially in a row direction and are substantially parallel to each other, while the data lines $D_1$-$D_m$ extend substantially in a column direction and are substantially parallel to each other.

Each pixel includes a switching element T connected to the display signal lines $G_1$-$G_n$ and $D_1$-$D_m$ and an LC capacitor $C_{LC}$ and a storage capacitor $C_{ST}$ that are connected to the switching element T. The switching element T such as a TFT is provided on the lower substrate 11 and has three terminals: a control terminal connected to one of the gate lines $G_1$-$G_n$; an input terminal connected to one of the data lines $D_1$-$D_m$ and an output terminal connected to the LC capacitor $C_{LC}$ and the storage capacitor $C_{ST}$.

The storage capacitor $C_{ST}$ is an auxiliary capacitor for the LC capacitor $C_{LC}$. The storage capacitor $C_{ST}$ is supplied with a predetermined voltage such as the common voltage $V_{com}$.

The conventional transmissive LCD 10 with four color RGBW pixels, however, may have other difficulties. For example, the four color liquid crystal display applied as a micro-reflective transmission display requires improving both reflectance and reflective contrast ratio (CR). For micro-reflective transmission LCDS, reflection from back light unit (BLU) is defined as external reflection, while reflection from electrodes of storage capacitor $C_{ST}$ or metal signal and data lines is defined as internal reflection. The internal reflection can cause noise in micro-reflective transmission LCDS, thus the reflective contrast ratio (CR) is reduced. As such, the storage capacitor $C_{ST}$ corresponding to each pixel reflects the ambient light internally, as indicated in $L_R$. Since internal reflection $L_{RW}$ in the white sub-pixel WP lacks color filter blocking, both internal and external reflection in the white sub-pixel WP may deteriorate reflective quality noise such that the conventional four color liquid crystal display cannot attain the desired reflective image quality due to deteriorated reflective contrast ratio (CR).

SUMMARY

Accordingly, the invention provides a micro-reflective transmission LCD with four color RGBW sub-pixel regions in which the storage capacitor corresponding to the white pixel region is positioned at one of the other three color sub-pixel regions.

Systems for displaying images are provided. In this regard, an exemplary embodiment of such a system comprises a liquid crystal display (LCD) panel. The LCD panel comprises a first substrate with an array of three primary color sub-pixel regions and a white sub-pixel region, a second substrate, and a liquid crystal layer interposed between the first substrate and the second substrate. Each sub-pixel region has a transistor and a storage capacitor with respect to the transistor. The storage capacitor with respect to the transistor of the white sub-pixel region is disposed within the area of one of the three primary color sub-pixel regions.

Another exemplary embodiment of the invention also provides a system for displaying images comprising a liquid crystal display (LCD) panel. The LCD panel comprises a first substrate comprising an array of three primary color sub-pixel regions and a white sub-pixel region. Each sub-pixel region has a transistor and a storage capacitor with respect to the transistor. A second substrate comprises three primary color filters with respect to the three primary color sub-pixel regions. A liquid crystal layer is interposed between the first substrate and the second substrate. The area of one of the three primary color filters is greater than the area of the corresponding sub-pixel regions. Therefore, the storage capacitor of the white pixel is disposed within the area of the greater of the three primary color filters.

DESCRIPTION OF THE DRAWINGS

The invention will become more fully understood from the detailed description given hereinbelow and the accompanying drawings, given by way of illustration only and thus not intended to be limited.

DETAILED DESCRIPTION OF THE INVENTION

Before explaining the disclosed invention in detail, it is to be understood that the invention is not limited in its application to the details of the particular arrangements shown since the invention is capable of other embodiments. Also, the terminology used herein is for the purpose of description and not limited thereto.

Figure 3:
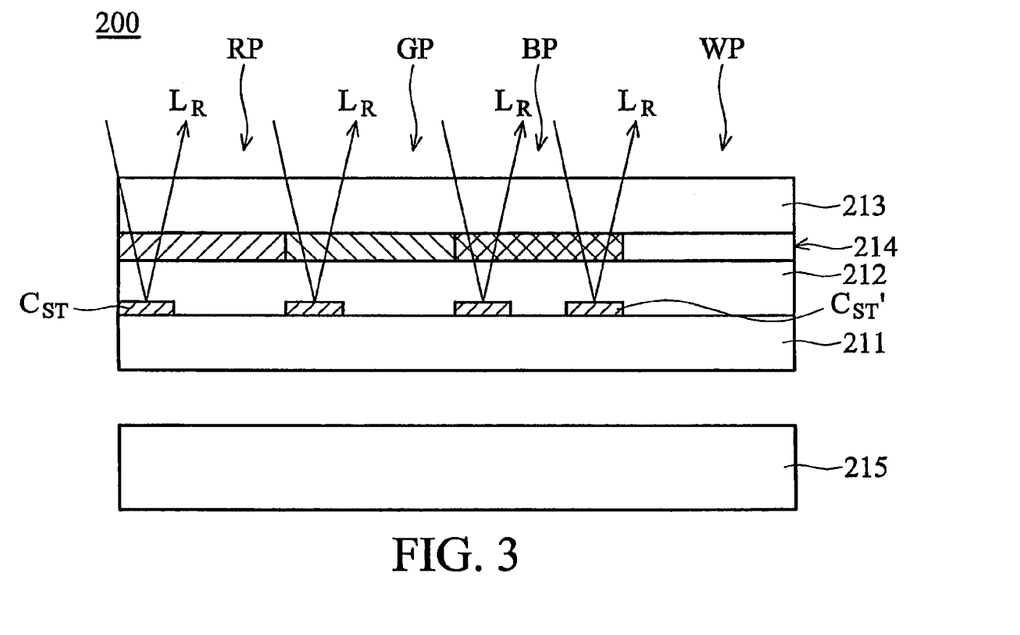
FIG. 3 is a cross-section of an arrangement of an embodiment of a micro-reflective transmission LCD.

FIG. 3 is a cross-section of an arrangement of an embodiment of a micro-reflective transmission LCD. A micro-reflective transmission LCD 200 comprises four color RGBW sub-pixel regions. Each sub-pixel region comprises a lower substrate 211 provided with storage capacitor $C_{ST}$ and thin film transistor (not shown) thereon, an upper substrate 213, and a liquid crystal layer 212 with dielectric anisotropy interposed between the lower substrate 211 and the upper substrate 213. The storage capacitor $C_{ST}'$ corresponding to the white sub-pixel region WP is positioned at one of the other three color sub-pixel regions. For example, the storage capacitor $C_{ST}'$ with respect to the transistor of the white sub-pixel region WP can be disposed within the area of the blue sub-pixel region BP due to its ability to block internal reflection.

Color filters 214 are disposed on the upper substrate 213. The white sub-pixel region WP may have no color filter. A pair of polarizers (not shown) polarizing incident light are attached on the outer surface of the substrates 211 and 213 of the micro-reflective transmission LCD 200.

The micro-reflective transmission LCD 200 can provide a reflective image since ambient light is incident to the panel and externally reflects from the backlight unit (BLU) 215.

Figure 4:
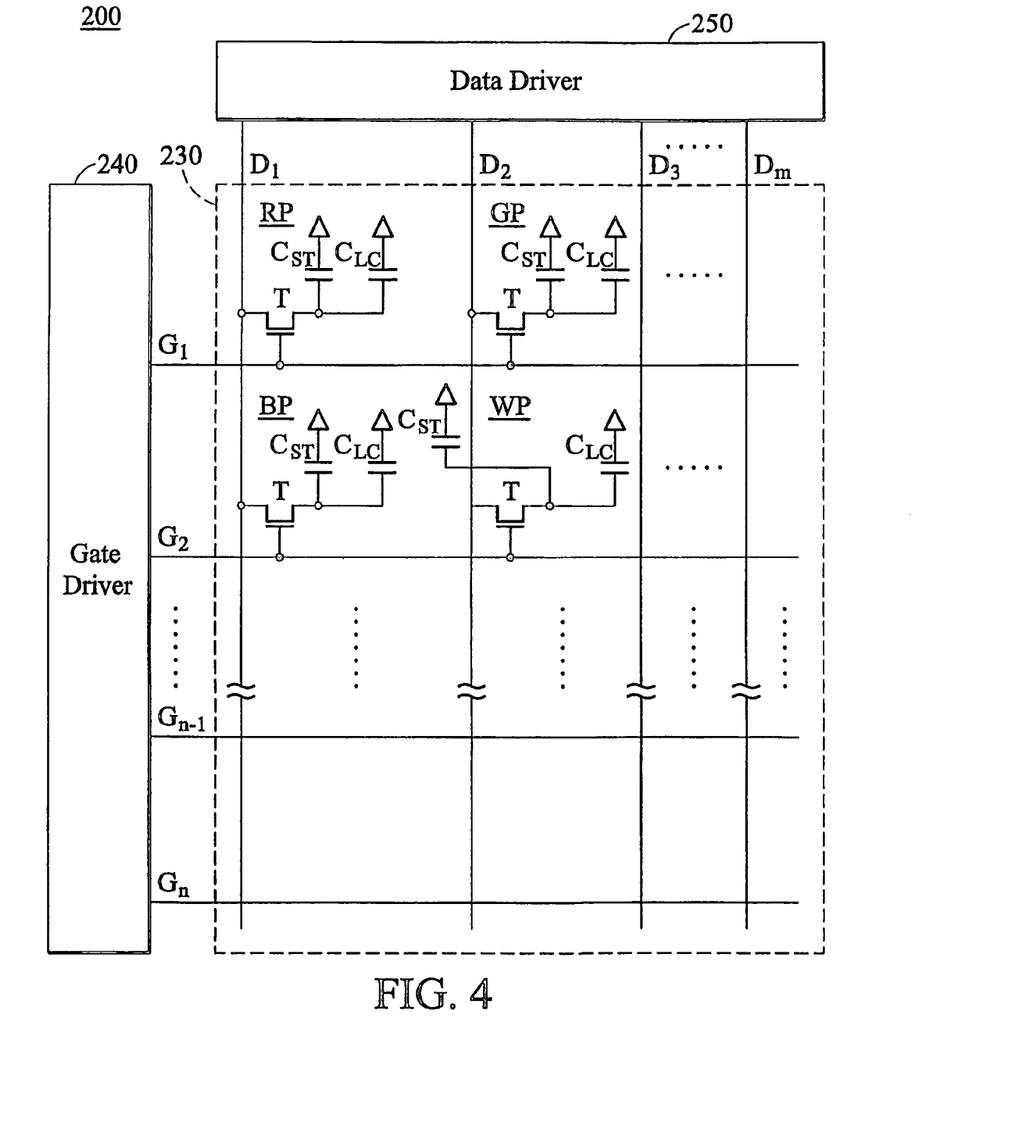
FIG. 4 is a block diagram of an embodiment of a four color micro-reflective transmission LCD.

FIG. 4 is a block diagram of an embodiment of a four color micro-reflective transmission LCD of the invention. The micro-reflective transmission LCD 200 comprises a LC panel assembly 230, a gate driver 240 and a data driver 250 which are connected to the panel assembly 230 and a signal controller (not shown) controlling the above elements.

The LC panel assembly 230, in structural view shown in FIG. 3, includes a lower substrate 211, an upper substrate 213 and a liquid crystal layer 212 interposed therebetween while it comprises a plurality of display signal lines $G_l$-$G_n$ and $D_l$-$D_m$ and a plurality of pixels connected thereto and arranged substantially in a matrix.

The display signal lines $G_l$-$G_n$ and $D_l$-$D_m$ are provided on the lower substrate 211 and comprise a plurality of gate lines $G_l$-$G_n$ transmitting gate signals (called scanning signals) and a plurality of data lines $D_l$-$D_m$ transmitting data signals. The gate lines $G_l$-$G_n$ extend substantially in a row direction and are substantially parallel to each other, while the data lines $D_l$-$D_m$ extend substantially in a column direction and are substantially parallel.

Each pixel includes a switching element T connected to the display signal lines $G_l$-$G_n$ and $D_l$-$D_m$ and an LC capacitor $C_{LC}$ and a storage capacitor $C_{ST}$ that are connected to the switching element T.

The switching element T such as a TFT is provided on the lower substrate 211 and has three terminals: a control terminal connected to one of the gate lines $G_l$-$G_n$; an input terminal connected to one of the data lines $D_l$-$D_m$ and an output terminal connected to the LC capacitor $C_{LC}$ and the storage capacitor $C_{ST}$.

The LC capacitor $C_{LC}$ includes a pixel electrode on the lower substrate, a common electrode on the upper substrate, and the LC layer as a dielectric between the electrodes. The pixel electrode is connected to the switching element T, and the common electrode covers the entire surface of the upper substrate.

The storage capacitor $C_{ST}$ is an auxiliary capacitor for the LC capacitor $C_{LC}$. Alternatively, the storage capacitor $C_{ST}$ includes the pixel electrode 190 and an adjacent gate line called a previous gate line, which overlaps the pixel electrode 190 via an insulator. Each sub-pixel region has a transistor T and a storage capacitor $C_{ST}$ with respect to the transistor T. The storage capacitor $C_{ST}'$ with respect to the transistor T of the white sub-pixel region WP is disposed at one of the other three color sub-pixel regions. More specifically, the storage capacitor $C_{ST}'$ with respect to the transistor T of the white pixel WP is disposed within the area of the blue sub-pixel region BP.

Color filters can block internal reflection, thereby reducing noise in micro-reflective transmission LCDS. Since the storage capacitor $C_{ST}'$ of the white sub-pixel region WP is disposed at one of the three primary color regions, internal reflection of the ambient light from electrodes the storage capacitor $C_{ST}'$ is blocked by color filters.

An exemplary detailed structure of a TFT array panel for an LCD according to an embodiment of the invention will be described with reference to FIGS. 5 and 6.

Figure 5:
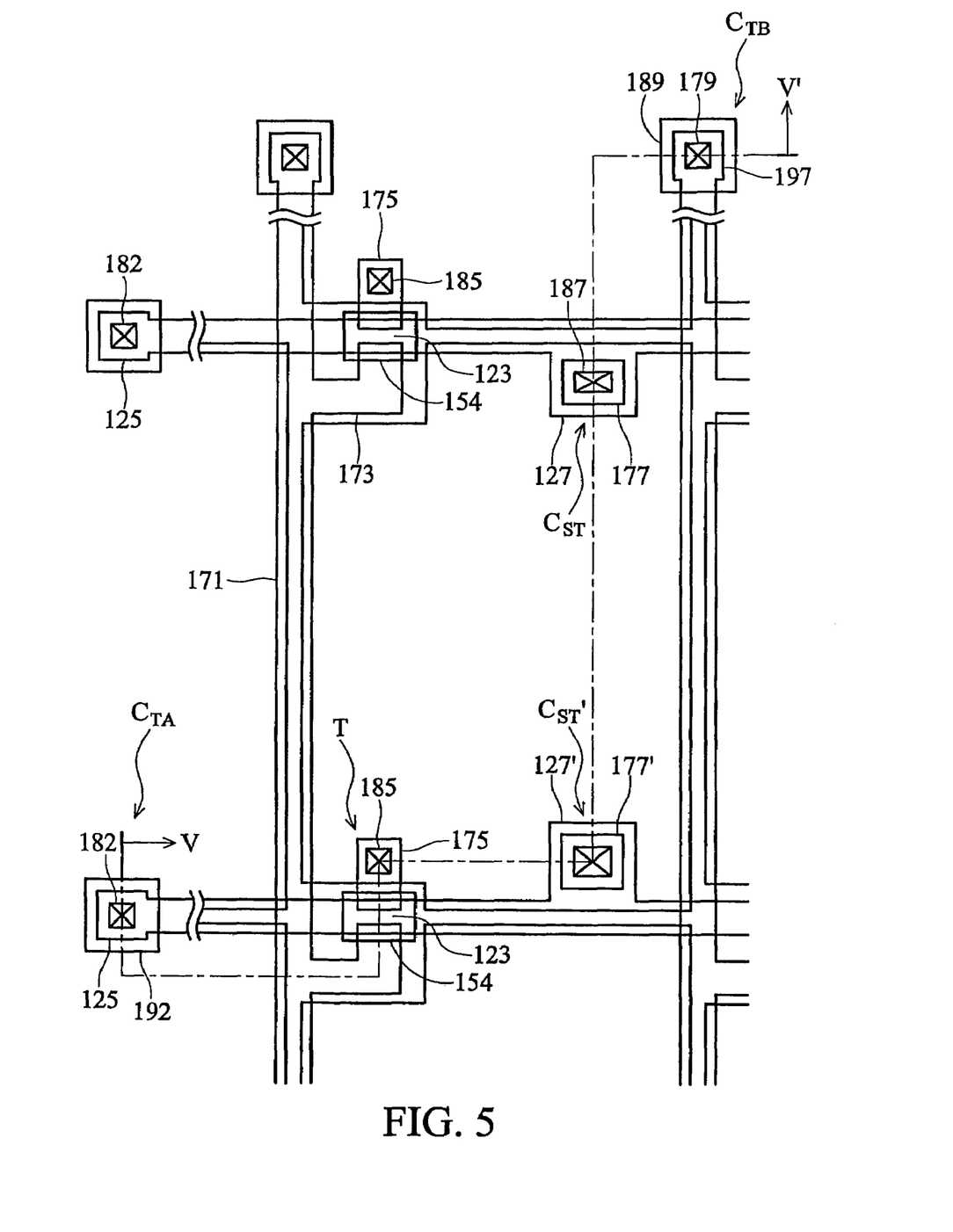
FIG. 5 is a layout view of an exemplary embodiment of a TFT array substrate for a micro-reflective transmission LCD of the invention.
Figure 6:
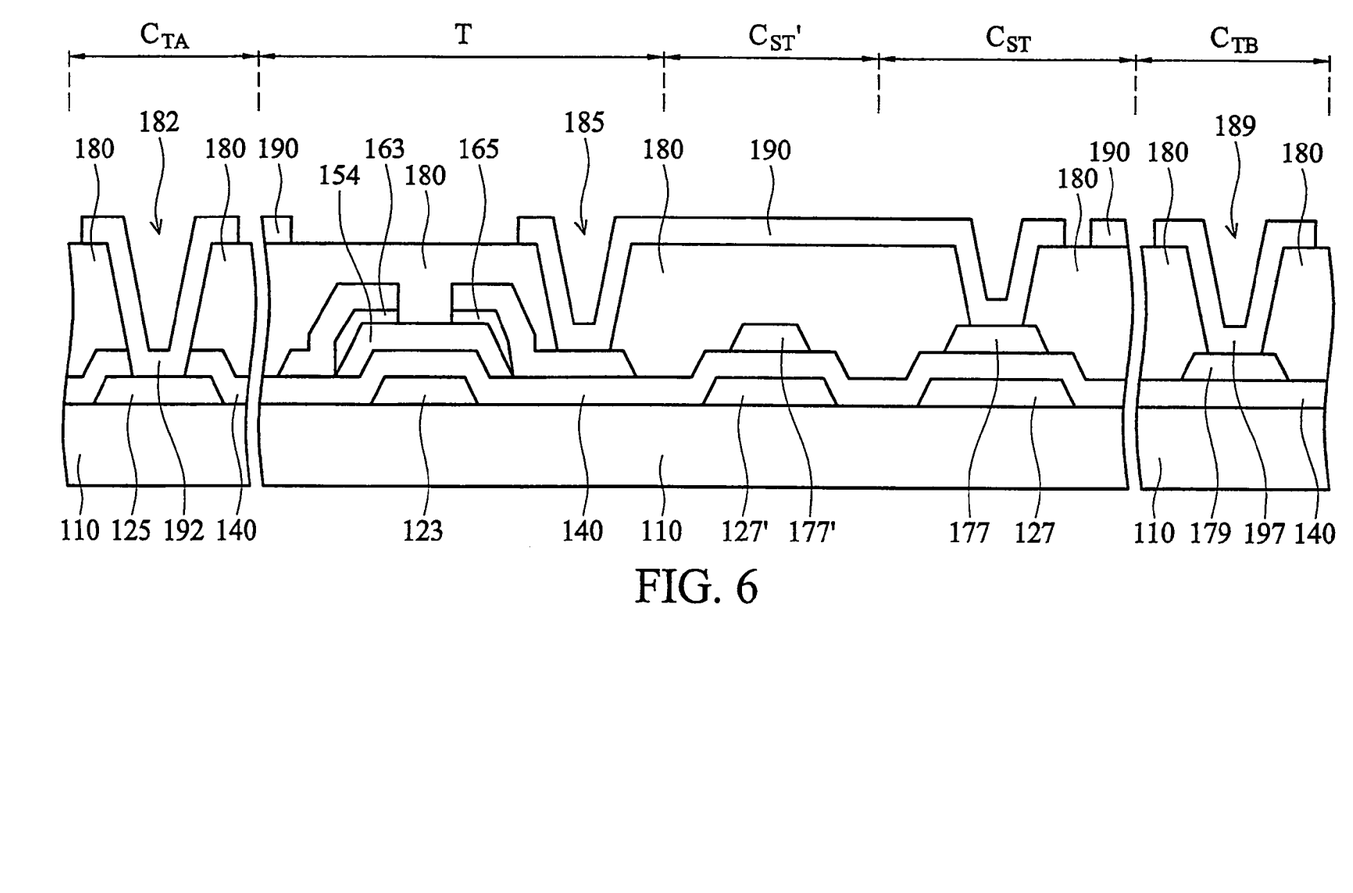
FIG. 6 is a cross-section of the TFT array substrate shown in FIG. 5 taken along the line V-V'.

FIG. 5 is a layout view of an exemplary embodiment of a TFT array substrate for a micro-reflective transmission LCD of the invention, and FIG. 6 is a cross-section of the TFT array substrate shown in FIG. 5 taken along the line V-V'.

The storage capacitor conductors 177 overlap the expansions 127 of the gate lines 121. An embodiment of the invention provides a storage capacitor conductor 177' corresponding to white sub-pixel region WP disposed overlapping the expansions 127' of the gate lines 121 at the blue color sub-pixel region BP.

Since the storage capacitor $C_{ST}'$, with respect to the transistor T of the white sub-pixel region WP, is disposed at blue color sub-pixel region BP, internal reflection of the ambient light is blocked by the blue color filter. Thus, both reflective image quality and reflective contrast ratio (CR) are improved.

Alternatively, another embodiment of the invention provides one of the three primary color filters formed with an area greater than the corresponding sub-pixel area. For example the blue color filter is formed overlying parts of white sub-pixel region WP, i.e., the storage capacitor $C_{ST'}$ corresponding to white sub-pixel region is disposed under the area of the blue color filter.

Figure 7:
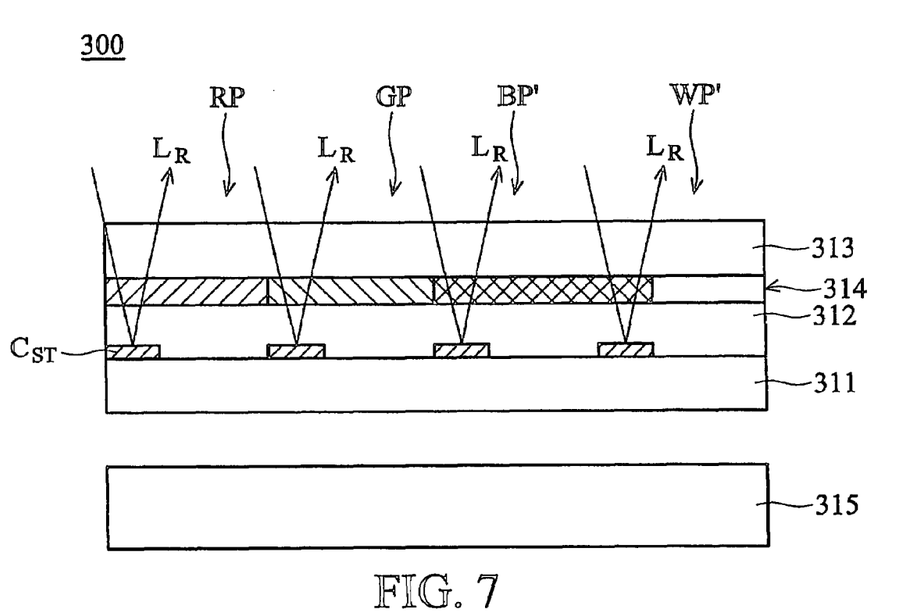
FIG. 7 is a cross-section of another arrangement of an embodiment of a micro-reflective transmission LCD.

FIG. 7 is a cross-section of an arrangement of another embodiment of a micro-reflective transmission LCD 300. One of the three primary color filters can be made to substantially extend to the white sub-pixel region covering the storage capacitor $C_{ST}'$ corresponding to the white sub-pixel WP. For example, blue color filter BP' is made to substantially extend to the white sub-pixel region covering the storage capacitor $C_{ST}'$. The white sub-pixel region corresponds to one of a clear filter with high transparency, a white filter, or no filter. Since the blue color filter can efficiently block internal reflection, noise of the micro-reflective transmission LCD is therefore reduced and both reflectance and reflective contrast ratio (CR) are improved.

Figure 8A:
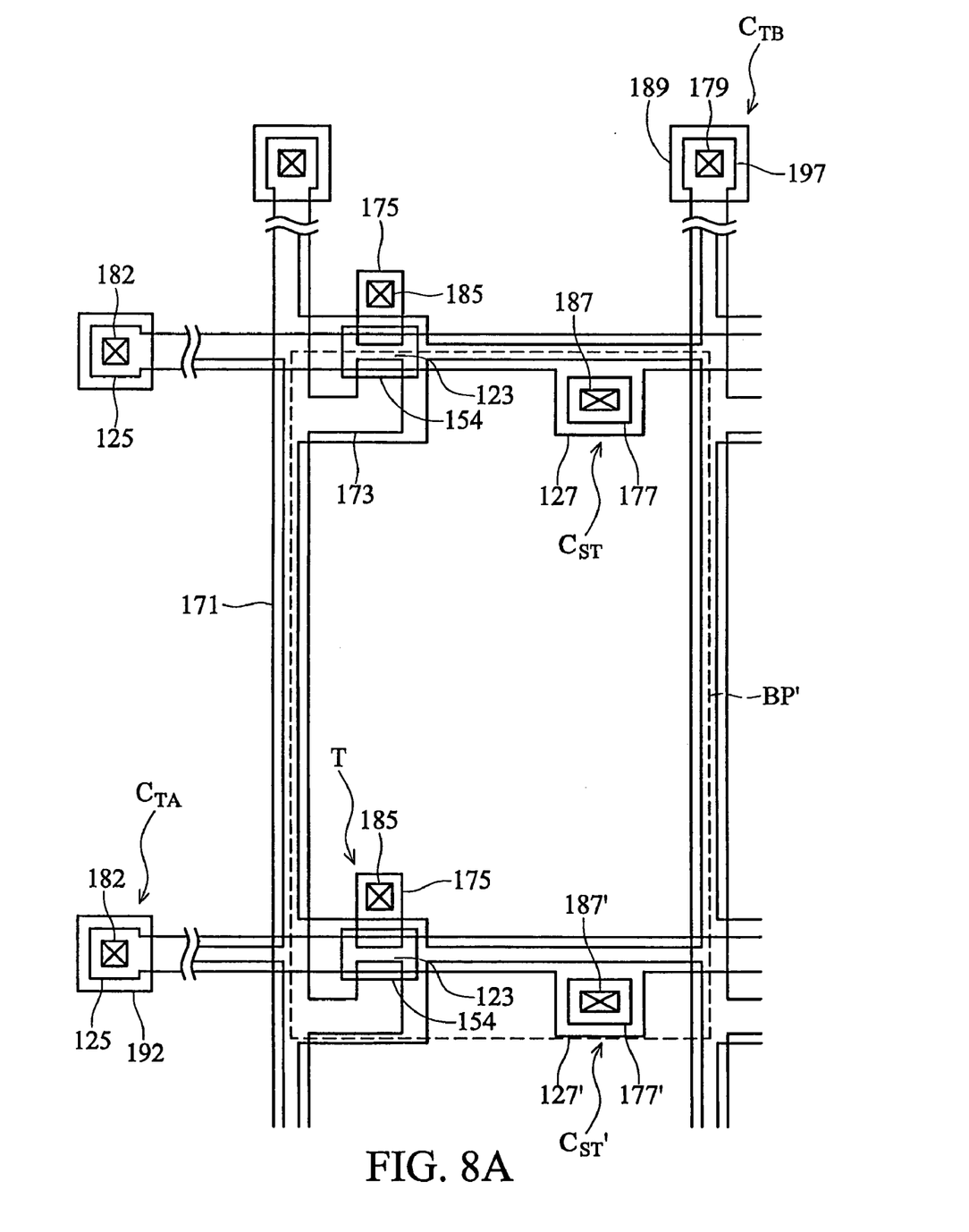
FIG. 8A is a layout view of an exemplary blue color sub-pixel region, where blue color filter BP' is made substantially extending to the white sub-pixel region covering the storage capacitor $C_{ST}'$.
Figure 8B:
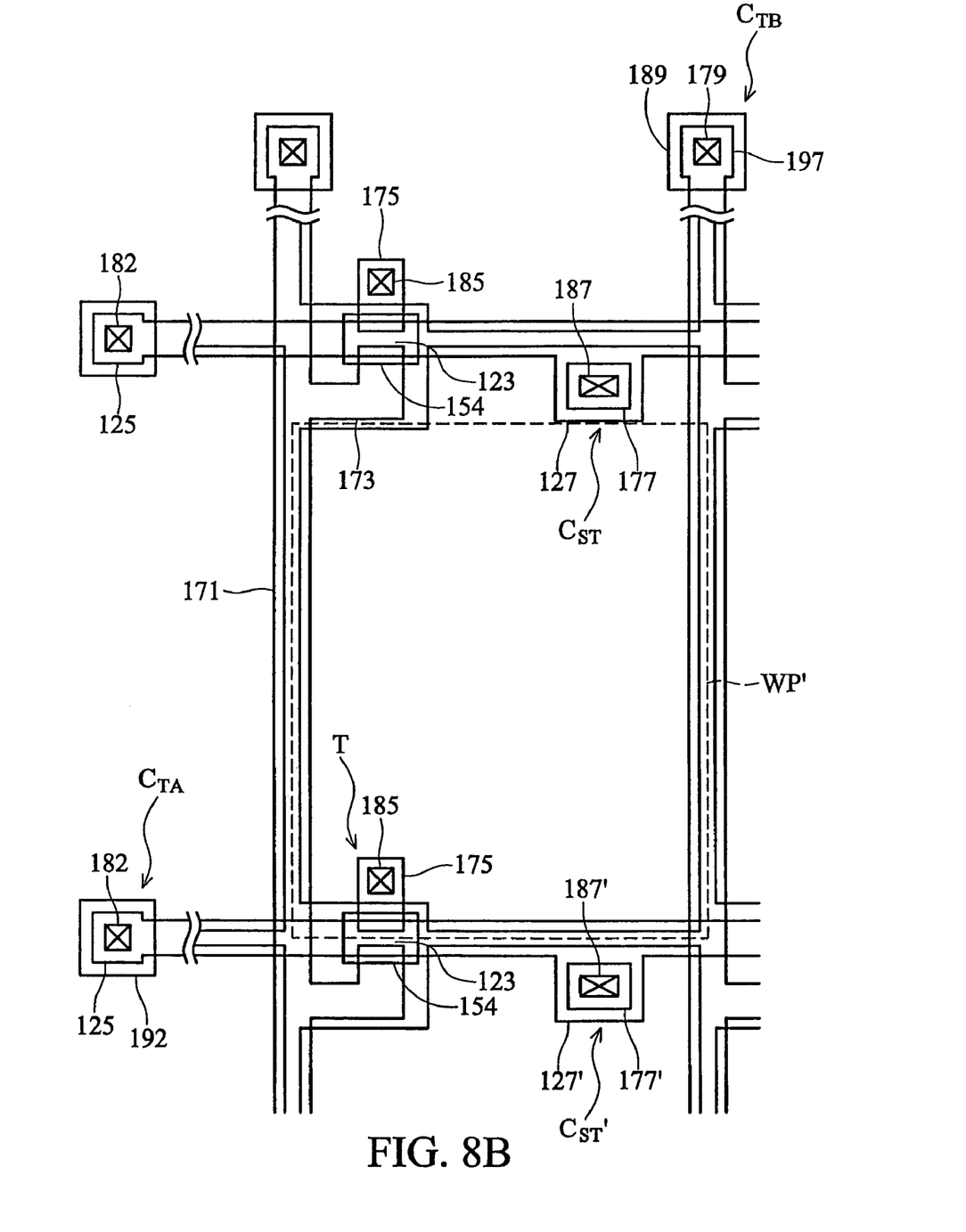
FIG. 8B is a layout view of an exemplary white sub-pixel region of the micro-reflective transmission LCD.

FIG. 8A is a layout view of an exemplary blue color sub-pixel, where blue color filter BP' is made to substantially extend to the white sub-pixel region WP' covering the storage capacitor $C_{ST}'$. FIG. 8B is a layout view of an exemplary white sub-pixel region WP' of the micro-reflective transmission LCD 300.

Figure 9:
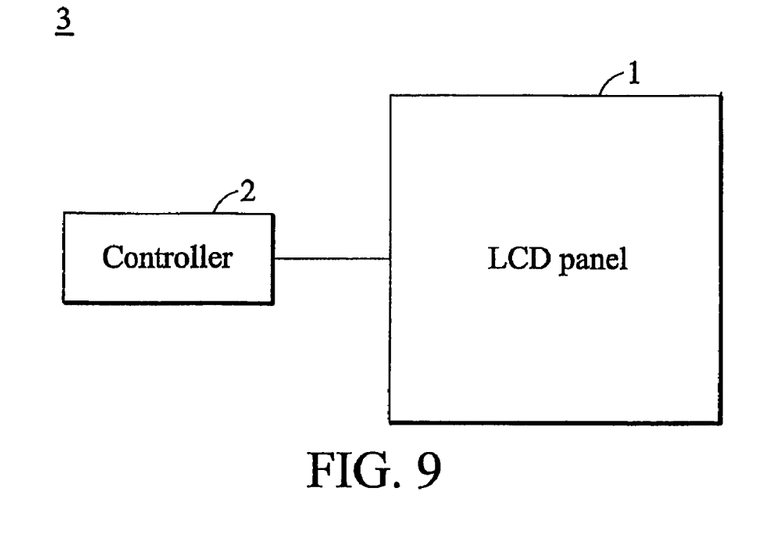
FIG. 9 schematically shows another embodiment of a system for displaying images.

FIG. 9 schematically shows another embodiment of a system for displaying images, which in this case, is implemented as a display device 3 comprising the micro-reflective transmission liquid crystal display panel 1 of the invention, such as the display panel 200 and 300 shown in FIG. 3 and FIG. 7. The micro-reflective transmission LCD panel 1 can be coupled to a controller 2, forming a display device 3 as shown in FIG. 9. The controller 3 can comprise a source and a gate driving circuits (not shown) to control the micro-reflective transmission LCD panel 1 to render image in accordance with an input.

Figure 10:
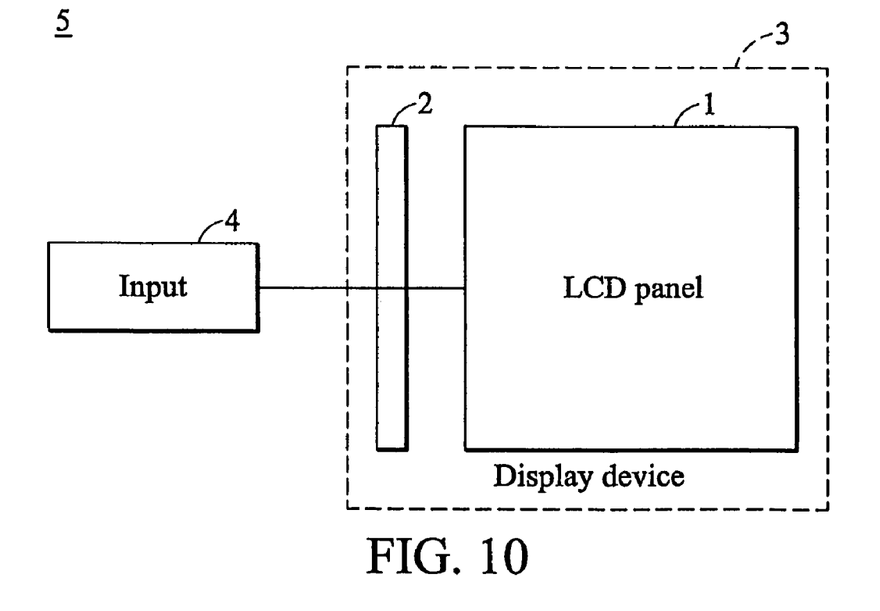
FIG. 10 schematically shows another embodiment of a system for displaying images.

FIG. 10 schematically shows another embodiment of a system for displaying images, which in this case, is implemented as an electronic device 5, incorporating a display device comprising the micro-reflective transmission LCD panel of the invention. An input device 4 is coupled to the controller 2 of the display device 3 shown in FIG. 10 can include a processor or the like to input data to the controller 2 to render an image. The electronic device 5 may be a portable device such as a PDA, notebook computer, tablet computer, cellular phone, or a desktop computer.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images comprising:
    a liquid crystal display panel comprising:
        a first substrate comprising an array of three primary color sub-pixel regions and a white sub-pixel region, each sub-pixel region having a transistor and a storage capacitor with respect to the transistor;
        a second substrate; and
        a liquid crystal layer interposed between the first substrate and the second substrate;
    wherein the storage capacitor with respect to the transistor of the white sub-pixel region is disposed within the area of one of the three primary color sub-pixel regions.

2. The system for displaying images as claimed in claim 1, wherein the liquid crystal display is a micro-reflective transmission liquid crystal display.

3. The system for displaying images as claimed in claim 1, wherein the three primary color sub-pixel regions comprise a red sub-pixel region, a green sub-pixel region, and a blue sub-pixel region.

4. The system for displaying images as claimed as claim 3, wherein the storage capacitor with respect to the transistor of the white sub-pixel region is located within the area of the blue sub-pixel region.

5. The system for displaying images as claimed in claim 1, wherein the white color sub-pixel region corresponds to one of a clear filter, a white filter, or no filter.

6. The system for displaying images as claimed in claim 1, wherein the second substrate is a color filter substrate.

7. The system for displaying images as claimed in claim 1, wherein each of the three primary color sub-pixel region and the white sub-pixel region have equal pixel area.

8. The system for displaying images as claimed in claim 1, further comprising a backlight unit disposed outside the second substrate.

9. The system for displaying images as claimed in claim 1, further comprising a controller coupled to the liquid crystal display panel to control the panel to render an image in accordance with an input 10. The system for displaying images as claimed in claim 9, further comprising: an input device coupled to the controller of the liquid crystal display device to control the display device to render an image.

11. The system for displaying images as claimed in claim 1, wherein the second substrate comprising three color filters with respect to the three primary color sub-pixel regions, and wherein one of the three primary color filters is greater than its corresponding sub-pixel area, thereby covering the storage capacitor of the white sub-pixel region.

12. A system for displaying images comprising:
    a liquid crystal display panel comprising:
        a first substrate comprising an array of three primary color sub-pixel regions and a white sub-pixel region, each sub-pixel region having a transistor and a storage capacitor with respect to the transistor,
        a second substrate comprising three color filters with respect to the three primary color sub-pixel regions; and
        a liquid crystal layer interposed between the first substrate and the second substrate;
    wherein one of the three primary color filters is greater than its corresponding sub-pixel area, thereby covering the storage capacitor of the white sub-pixel region such that the storage capacitor is disposed within the area of said one of the three primary color sub-pixel regions.

13. The system for displaying images as claimed in claim 12, wherein the liquid crystal display is a micro-reflective transmission liquid crystal display.

14. The system for displaying images as claimed in claim 12, wherein the white color sub-pixel region corresponds to one of a clear filter, a white filter, or no filter.

15. The system for displaying images as claimed in claim 12, wherein the three color sub-pixel regions comprises a red sub-pixel region, a green sub-pixel, and a blue sub-pixel.

16. The system for displaying images as claimed in claim 12, wherein the three primary color filters comprise a red filter, a green filter, and a blue filter.

17. The system for displaying images as claimed in claim 16, wherein the greater one of the three primary color filters is the blue filter.

18. The system for displaying images as claimed in claim 12, further comprising a backlight unit disposed outside the second substrate.

19. The system for displaying images as claimed in claim 12, further comprising a controller coupled to the liquid crystal display panel to control the panel to render an image in accordance with an input.

20. The system for displaying images as claimed in claim 19, further comprising: an input device coupled to the controller of the liquid crystal display device to control the display device to reader an image.

* * * * *